US010367741B1

United States Patent
Ramey et al.

(10) Patent No.: US 10,367,741 B1
(45) Date of Patent: Jul. 30, 2019

(54) HIGH PERFORMANCE, SCALABLE MULTI CHIP INTERCONNECT

(71) Applicant: Mellanox Technologies, Ltd., Yokneam (IL)

(72) Inventors: Carl G. Ramey, Westborough, MA (US); Matthew Mattina, Boylston, MA (US)

(73) Assignee: Mellanox Technologies, Ltd., Yokneam (IL)

( * ) Notice: Subject to any disclaimer, the term of this patent is extended or adjusted under 35 U.S.C. 154(b) by 238 days.

(21) Appl. No.: 15/244,171

(22) Filed: Aug. 23, 2016

Related U.S. Application Data

(63) Continuation of application No. 13/789,801, filed on Mar. 8, 2013, now Pat. No. 9,424,225.

(60) Provisional application No. 61/721,069, filed on Nov. 1, 2012.

(51) Int. Cl.
*H04L 12/803* (2013.01)
*H04L 29/08* (2006.01)

(52) U.S. Cl.
CPC .......... *H04L 47/125* (2013.01); *H04L 67/101* (2013.01); *H04L 67/1008* (2013.01)

(58) Field of Classification Search
CPC .. H04L 47/125; H04L 67/1008; H04L 67/101
See application file for complete search history.

(56) References Cited

U.S. PATENT DOCUMENTS

| | | |
|---|---|---|
| 7,174,394 B1 | 2/2007 | Garner et al. |
| 7,636,825 B2 | 12/2009 | Mosek |
| 7,636,835 B1 * | 12/2009 | Ramey ............... G06F 9/30003 712/10 |
| 7,734,895 B1 * | 6/2010 | Agarwal .................. G06F 8/52 712/13 |
| 7,805,575 B1 | 9/2010 | Agarwal et al. |
| 7,853,754 B1 | 12/2010 | Agarwal et al. |
| 8,045,546 B1 * | 10/2011 | Bao ........................ H04L 45/14 370/386 |
| 8,916,910 B2 | 12/2014 | Geer et al. |
| 2002/0046271 A1 * | 4/2002 | Huang .................... H04L 45/00 709/223 |
| 2005/0021874 A1 | 1/2005 | Georgiou et al. |
| 2006/0143350 A1 | 6/2006 | Miloushev et al. |
| 2007/0180513 A1 | 8/2007 | Raz et al. |
| 2010/0080124 A1 | 4/2010 | Angiolini et al. |
| 2011/0125974 A1 | 5/2011 | Anderson |

(Continued)

FOREIGN PATENT DOCUMENTS

WO    WO2012/003486    5/2012

OTHER PUBLICATIONS

"Portland: A Scalable Fault-Tolerant Layer 2 Data Center Network Fabric", Mysore et al., ACM, Aug. 2009.

*Primary Examiner* — June Y Sison

(74) *Attorney, Agent, or Firm* — Fish & Richardson P.C.

(57) ABSTRACT

A flexible, scalable server is described. The server includes plural server nodes each server node including processor cores and switching circuitry configured to couple the processor to a network among the cores with the plurality of cores implementing networking functions within the compute nodes wherein the plurality of cores networking capabilities allow the cores to connect to each other, and to offer a single interface to a network coupled to the server.

18 Claims, 4 Drawing Sheets

(56) References Cited

U.S. PATENT DOCUMENTS

| | | |
|---|---|---|
| 2011/0239216 A1 | 9/2011 | Miyajima |
| 2013/0044728 A1 | 2/2013 | Shah et al. |
| 2013/0086328 A1 | 4/2013 | Frank et al. |
| 2013/0145375 A1 | 6/2013 | Kang |
| 2014/0033217 A1 | 1/2014 | Vajda et al. |

* cited by examiner

HIGH PERFORMANCE, SCALABLE MULTI CHIP INTERCONNECT

This application claims priority under 35 U.S.C. § 119 to U.S. Provisional Patent Application Ser. No. 61/721,069, filed Nov. 1, 2012, and entitled "High Performance, Scalable Multi Chip Interconnect", the entire contents of which are hereby incorporated by reference.

BACKGROUND

This invention relates to processors and more particularly to multi-chip processors.

Typical computer system server infrastructure such as in cloud-computing data centers is scaled to larger numbers of servers by adding more processing nodes. A processing node might be a compute server containing for example a multi-core processor chip. Along with the increased processing power provided by the processing nodes, the computer system server infrastructure has services such as switching, load balancing, and network access translation (NAT) and/firewall capabilities. The services required for additional computation nodes vary depending on the application.

SUMMARY

According to an aspect, a server compute node includes a plurality of tiled compute nodes, with multiple ones of the plurality of tiled compute nodes each including a processor, and switching circuitry configured to couple the processor to a network among the cores, and with the server compute node further configured to provide network switching functions within the plurality of tiled compute nodes of the server computer node.

The following are some of the features within the scope of the above aspect.

The networking switching functions within the plurality of cores are further configured to connect tiled compute nodes to each other to offer a single interface to a network coupled to the server compute node. In the network functions each of the tiled compute nodes includes a layer 2 switch that uses media access control addresses for forwarding frames, and with the plurality of tiled compute nodes arranged in a node stack topology. External networking components are not needed, as more nodes are added to the server compute node.

According to an additional aspect, a flexible, scalable server comprising plural server compute nodes each server compute node includes a plurality of cores, with multiple ones of the plurality of cores each including a processor, switching circuitry configured to couple the processor to a network among the cores, and with the plurality of cores further configured to provide network switching within the server compute node by the plurality of cores providing networking capabilities to allow the cores to connect to each other, and to offer a single interface to an external network coupled to the server compute node.

The following are some of the features within the scope of the above aspect.

The networking functions in the nodes has the nodes arranged in a node stacking topology with each node including an on-chip layer 2 switch to provide scalable node-stacking. The server node executes software running on the processor cores or in firmware in that node to provide load balancing across multiple nodes with a set of server nodes or processors providing a single network endpoint. Routing is implemented in fast-path software running within the processing node supporting layer-2 routing to IP routing, load-based routing, or "address" based routing. The server further includes fast path hardware in the processor node to allow low-latency and high-bandwidth switching capability. The routing functions are arranged with general purpose cores executing control path algorithms and data path algorithms are managed by hardware. Hardware services include packet classification, load-balancing, buffer management, and egress-reordering. Local network traffic is identified based on a physical port number or MAC address as well as more sophisticated dynamic information such as system load. A packet is switched based on a range comparison with an address field in the packet.

According to an additional aspect, a method of operating a server includes receiving packets that arrive at a receiver interface built in a multi-core processor chip, parsing the packets in a classifier engine of the multi-core to produce packet descriptors that determine the flow to which the packet belongs with either the classifier or software on the cores determining an egress port, applying load balancing to determine what core will operate on the packet, and enqueueing the packet descriptors generated by the classifier.

The following are some of the features within the scope of the above aspect.

The method further includes executing software on the processor cores to provide load balancing across multiple nodes with a set of server nodes or processors providing a single network endpoint. The method further includes arranging the nodes in a node stacking topology with each node providing an on-board or on-chip L2 (layer 2) switch to provide scalable node-stacking.

Traditional infrastructure components do not provide sufficient flexibility for ever-changing workloads. For example, a processing node generally serves as the termination point for network traffic, and commonly includes a connection to a network switch. Generally, it is relatively easy to add more processing nodes, but it is more challenging to add extra networking components as each processing node is added. Further, as more processing nodes are added, load balancing among the processing nodes becomes more of a concern. Processor nodes have traditionally addressed increased computation requirements, but the nodes have not adequately addressed the other required datacenter tasks such as switching and load balancing. With this approach flexibility is built into the server compute node making it relatively easy to add more networking functionality as more processing nodes are added.

The details of one or more embodiments of the invention are set forth in the accompanying drawings and the description below. Other features, objects, and advantages of the invention will be apparent from the description and drawings, and from the claims.

DETAILED DESCRIPTION

Exemplary System Overview

The system described in this section (with reference to FIGS. 1 and 1B) provides an overview of various aspects of a parallel processing environment that can be used for a variety of the techniques described in other sections.

A multicore processor can be manufactured as a chip containing multiple processing engines or cores. Using multiple cores to process applications can provide greater computing throughput and also lower power. There are many challenges to building a multicore processor. These include the challenges of how to connect the cores to each other efficiently, how to manage data sharing between the cores, how to supply data from input-output devices to the cores in a coherent manner, and how to construct operating systems for multicore processors. Bus based multicore chips use a bus to connect the cores, but buses may be a throughput bottleneck and may also consume a lot of power. An alternative way to connect the cores is to use a point-to-point network such as a mesh network or a ring network. Networks such as a mesh have switches arranged in a grid pattern in which neighboring switches are connected to each other. When the cores include a switch component for a network such as a mesh, the cores can be laid out in a simple rectangular tiled pattern. Such multicore chips are called tiled multicore processors. Because the conductor paths are short in tiled multicore processors, signals can travel short distances when neighboring cores need to communicate. Tiled multicore processors generally consume lower power than bus based multicore processors.

U.S. patent application Ser. No. 12/885,957 entitled: "Managing Shared Resources In an Operating System" filed: Sep. 20, 2010; and U.S. patent application Ser. No. 46/280,927 entitled: "Computing In Parallel Processing Environments" filed: Oct. 25, 2011 are incorporated herein by reference in their entirety.

Figure 1:
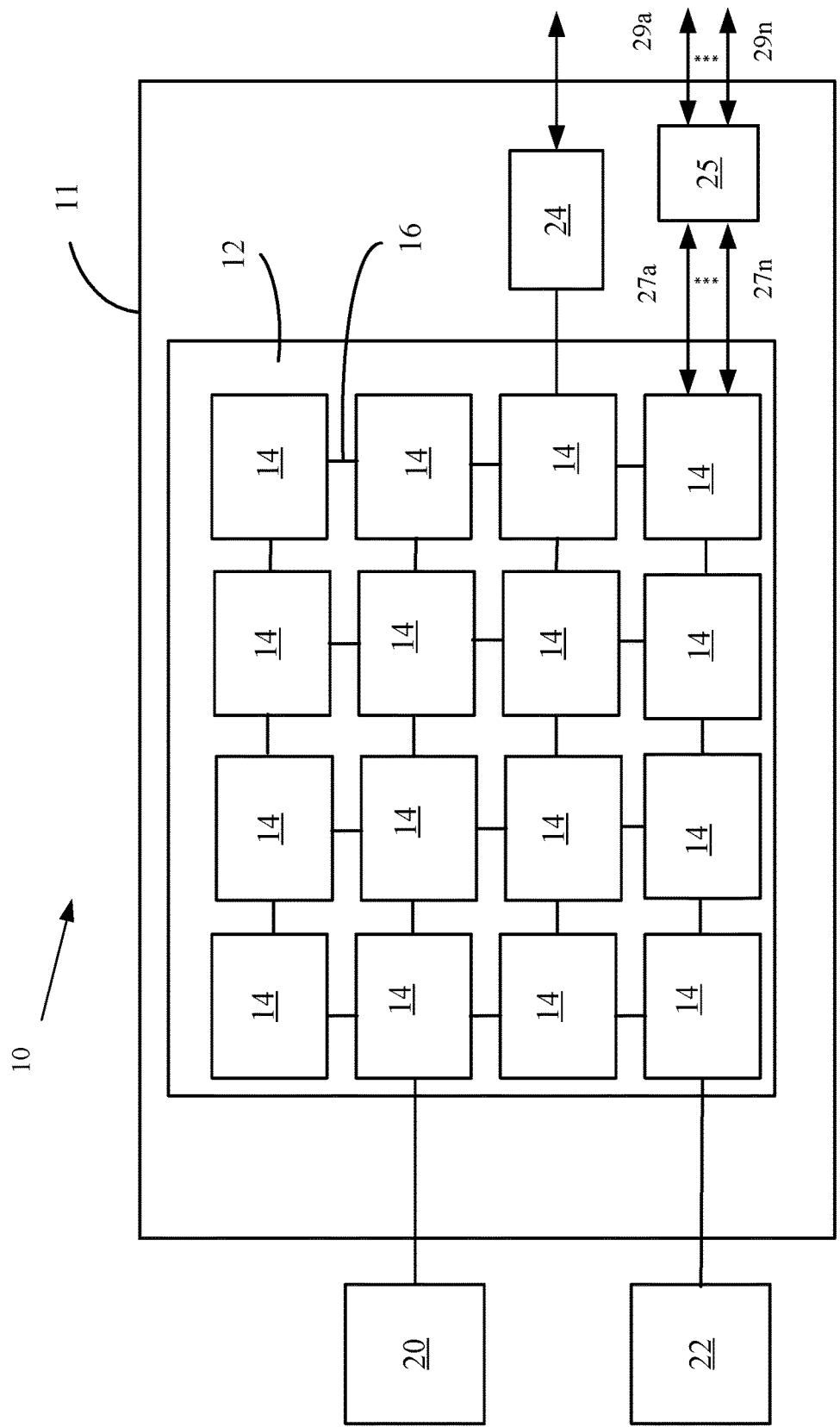
FIG. 1 is a block diagram of a tiled integrated circuit.

Referring to FIG. 1, a tiled compute node 10 provided as an integrated circuit 11 (or "chip") including an array 12 of interconnected tiles 14 is shown. Each of the tiles 14 is a functional unit that includes a processor (not shown) (or "processor core") and a switch (not shown) that forwards data from other tiles 14 to the processor and to switches of other tiles 14 over data paths, generally 16. The processor and switch will be discussed in FIG. 2. Generally, the switch is coupled to the processor so that data can be sent to or received from processors of other tiles 14 over a communication fabric formed by the switches and data paths. The tiled compute node 10 includes other on-chip circuitry such as input/output (I/O) interface circuitry to couple data in and out of the circuit 10, and clock distribution circuitry to provide clock signals to the processors of the tiles 14.

The tiled compute node 10 shown in FIG. 1 includes a two-dimensional array 12 of rectangular tiles 14 with data paths 16 between neighboring tiles 14 to form a mesh network. The data path 4 between any two tiles 14 can include multiple conductor paths (or "wires") to support parallel channels in each direction. Optionally, specific sets of conductors between two tiles 14 can be dedicated to different mesh networks that can operate independently.

Alternative network configurations include buses, rings, crossbars, hypercubes, trees, or networks having paths that extend to diagonal neighbors or to tiles 14 that are multiple rows or columns away. Other configurations include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network. The tiled compute node 10 also includes on-board or on-chip L2 (layer 2) switch 25. Switch 25 includes plural internal I/O ports 27a-27n and plural external I/O ports 29a-29n. An L2 switch, refers to "Layer 2" of the "Open Systems Interconnection" (OSI) model (ISO/IEC 7498-1) International Organization for Standardization. A L2 switch uses media access control addresses (MAC addresses) from a host's network interface cards to decide where to forward frames (encapsulated packets).

The data paths 16 from one or more tiles 14 at the edge of the network can be coupled out of the array of tiles 14 (e.g., over I/O pins) to an on-chip device 20, an off-chip device 22, or a communication channel interface 24, for example. Multiple conductors of one or more parallel channels can be multiplexed down to a fewer number of pins or to a serial channel interface. For example, the conductors for one or more channels can be multiplexed onto a high-speed serial link (e.g., SerDes) or a memory controller interface (e.g., a memory controller for DDR or Dynamic RAM—also known as DRAM). The memory controller can be implemented off-chip or in logic blocks within a tile or on the periphery of the tiled compute node 10.

The following exemplary implementations are described in the context of tiles 14 that have the same structure and functionality. Alternatively there can be multiple "tile types" each having different structure and/or functionality. For example, tiles 14 that couple data off of the tiled compute node 10 can include additional circuitry for I/O functions.

Figure 2:
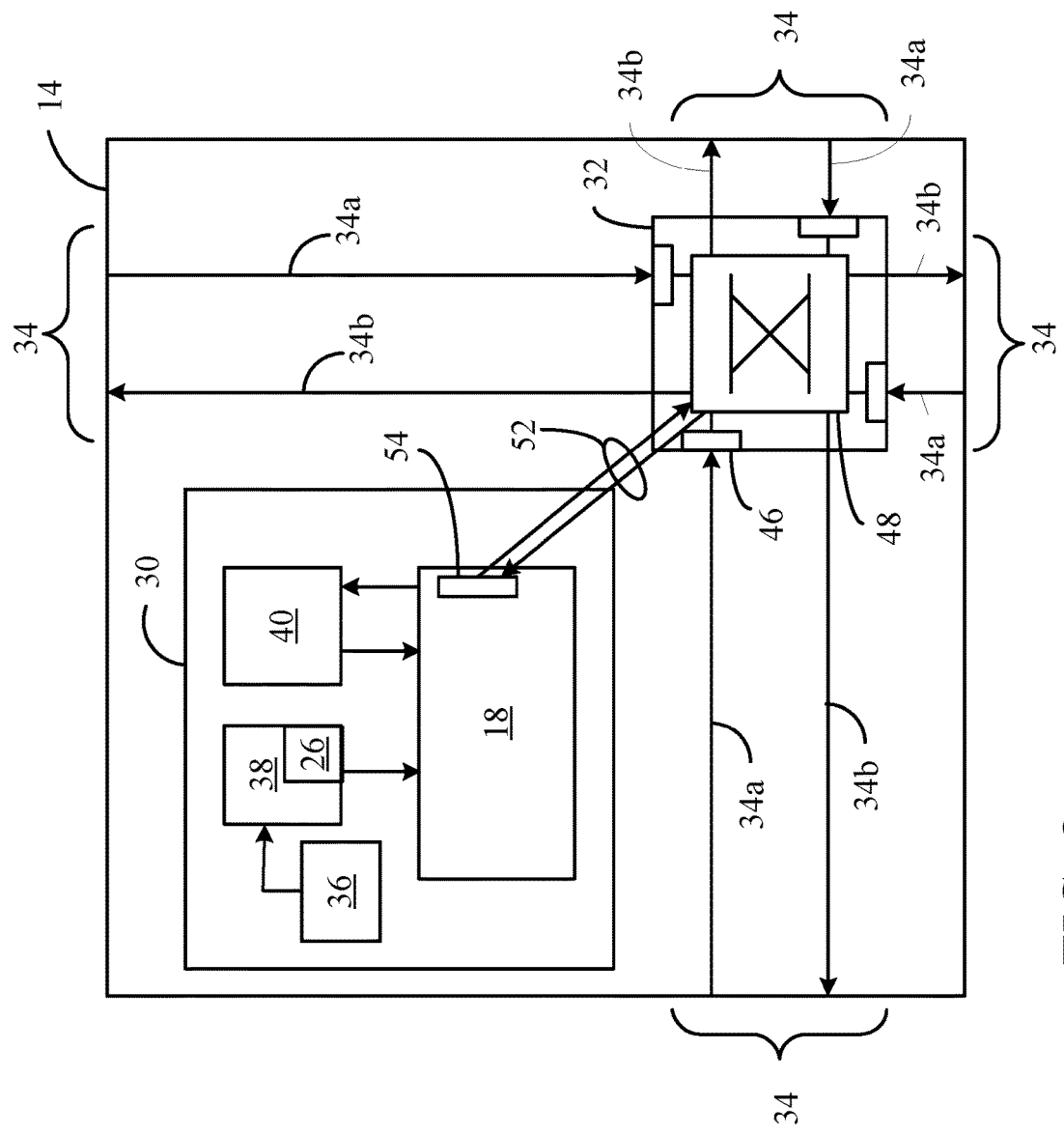
FIG. 2 is a block diagram of a tile.

Referring to FIG. 2, a tile 14 includes a processor 30, a switch 32, and sets of incoming conductors 34a and outgoing conductors 34b (generally conductors 34) that form the data paths 16 for communicating with neighboring tiles 14. The processor 30 includes a program counter 36, an instruction memory 38, a data cache memory 40, and a pipeline 42. The processor 30 can use any of a variety of pipelined architectures. The pipeline 42 includes pipeline registers, functional units such as one or more arithmetic logic units (ALUs), and temporary storage such as a register file (not shown). The stages in the pipeline 42 include, for example, instruction fetch and decode stages, a register fetch stage, instruction execution stages, and a write-back stage. In instruction memory 38 is software 26 that provides load balancing across multiple nodes allowing a set of processors to be considered as a single network endpoint. Alternatively, or in addition thereto the software 26 implements fast-path software to support various protocols from simple layer-2 routing to IP routing, load-based routing, and "address" based routing.

Either or both of the instruction memory 38 and data cache memory 40 can be configured to operate as a cache for off-chip memory. The cache hierarchy can take many forms, and the description here is just one example. For example, the instruction memory 38 includes an instruction cache that caches instructions, which can be a level 1 instruction cache (L1I), and the data cache memory 40 includes a data cache that caches data, which can be a level 1 data cache (L1D). Both the L1I cache and the L1D cache can be backed up by a level 2 unified cache (L2U) that is usually larger in size than either of the L1 caches. The caches are controlled by a cache controller.

On a cache miss from the L1I or L1D caches, the L2U cache is checked. If the data is found in the L2U cache, then a cache miss can be averted. If the instruction or data is not found in the L2U, then the instruction or data is fetched from outside the tile. Typically, the processor checks the cache in another tile called the home tile for that particular address that missed. This way, the L2U caches in the other tiles 14 serve as a large distributed L3 cache. If the home tile has an entry for the data item (within a home location of a home cache in the home tile), the home tile can supply the data item to the requesting tile. If even the home tile causes a cache miss, then, as an example, the home tile handles the cache miss by sending the cache request to external memory (to DRAM typically) and obtains the data item from the external memory. The cache miss from the requesting tile gets turned into a message that traverses the network to get to the home tile. Similarly, the miss from the home tile to DRAM traverses the network.

Sometimes, instead of checking a home tile on a cache miss to the cache within a tile, the request is sent directly outside the chip to external DRAM memory.

The tile 14 can also include a cache controller that performs actions to ensure that cache coherence is maintained in the whole chip. Typically, the cache coherence information for a given cache line is maintained at the home tile for that cache line. The coherence information is stored in a directory to store the current state of the cache line. The home location for a given cache line is stored in a translation lookaside buffer (TLB) along with the page information for that cache line. The home location, within a home tile, for a given cache line can also be determined by hashing the cache line address to yield a home location. The home location can also be modified as the program executes. Data that has a home location in a home cache of a particular home tile is said to be "homed in" that particular tile.

The processor 30 can be multithreaded and/or have capabilities of a Very Long Instruction Word (VLIW) processor, a superscalar processor, or a vector processor.

Together the switches 11 in a multicore chip provide the communications infrastructure for all the cores. Switches can be built in many ways. As one example, the switch 32 includes input buffers 46 for temporarily storing data arriving over incoming conductors 34a, and switching circuitry 48 (e.g., a crossbar fabric) for forwarding data to outgoing conductors 34b or the processor 30. The input buffering provides pipelined data channels in which data traverses a data path 4 from one tile to a neighboring tile in predetermined number of clock cycles (e.g., a single clock cycle). This pipelined data transport enables the tiled compute node 10 to be scaled to a large number of tiles 14 without the need to limit the clock rate to account for effects due to conductor lengths such as propagation delay or capacitance. (Alternatively, the buffering could be at the output of the switching circuitry 48 instead of, or in addition to, the input.)

A tile 14 controls operation of the switch 32 using either the processor 30, or separate switch processor dedicated to controlling the switching circuitry 48. Separating the control of the processor 30 and the switch 32 allows the processor 30 to take arbitrary data dependent branches without disturbing the routing of independent messages passing through the switch 32.

In some implementations, the switch 32 includes a switch processor that receives a stream of switch instructions for determining which input and output ports of the switching circuitry to connect in any given cycle. For example, the switch instruction includes a segment or "sub-instruction" for each output port indicating to which input port it should be connected. In some implementations, the processor 30 receives a stream of compound instructions with a first instruction for execution in the pipeline 42 and a second instruction for controlling the switching circuitry 48.

The switch instructions enable efficient communication among the tiles 14 for communication patterns that are known at compile time. This type of routing is called "static routing." An example of data that would typically use static routing are operands of an instruction to be executed on a neighboring processor.

The switch also provides a form of routing called "dynamic routing" for communication patterns that are not necessarily known at compile time. Dynamic routing is also used for messages that result from cache misses or other cache coherence related transactions. In dynamic routing, circuitry in the switch 32 determines which input and output ports to connect based on header information in the data that is being dynamically routed during execution. A tile can send a message to any other tile by generating the appropriate address information in the message header. The tiles 14 along the route between the source and destination tiles 14 use a predetermined routing approach. For example, one routing approach is shortest Manhattan Routing (also known as dimension-ordered routing), which refers to routing along a first dimension followed by a second perpendicular dimension (where the distance between two points is measured by adding line segments that are arranged in a grid like pattern, with the line segments at right angles to each other, and not the straight line joining the two points). The number of hops along a route is deterministic but the latency depends on the congestion at each tile along the route. Examples of data traffic that would typically use dynamic routing are memory access traffic (e.g., to handle a cache miss) or interrupt messages.

The switch 32 includes dedicated circuitry for implementing each of these static and dynamic routing approaches. For example, each tile has a set of data paths, buffers, and switching circuitry for static routing, forming a "static network" for the tiles 14; and each tile has a set of data paths, buffers, and switching circuitry for dynamic routing, forming a "dynamic network" for the tiles 14. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

The switch 32 is coupled to the processor 30 over processor coupling conductors 52. For fast (e.g., low latency) communication between tiles 14 of neighboring processors, the coupling conductors 52 are integrated directly into the pipeline 42. The processor 30 communicates with the switch 32 using distinct op-codes to distinguish between accesses to the static and dynamic network ports. Alternatively, the instructions can use register names to refer to switch ports. For example, the processor can send or receive data by writing to or reading from a register interface that is directly mapped to the input buffers 46 of the switch 32. For data going to or coming from the processor 30, a switch instruction indicates that the switch 32 should couple data to or from a selected register or bypass path of the pipeline 42 over a register mapped pipeline integrated switch interface 54. This pipeline integration allows data to be available to the switch 32 the moment an instruction is executed and the register value is available. In the next cycle the same data could appear at an input buffer of another tile.

To improve the latency of dynamic routing switches the tiles 14 can use route prediction in the switches. With route prediction, a message that comes into an input port of the switch is routed to a given destination port of the switch based on a predicted port number. The prediction for a packet coming in from a given input port can be selected based on the route taken by the previous packet from that input port. If the hardware in the tile (e.g., prediction circuitry) determines that the prediction was incorrect, the hardware can take a few extra cycles to make the right routing decision based on the information in the packet header.

Other optimizations include using wide network channels. A tile can send single word messages containing both the packet header and the data value. The packet header includes information such as route information.

A tile 14 can include various types of memory modules to serve as the instruction memory 38, instruction memory 40 or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 14 or the tiled compute node 10. Such external memory (e.g., DRAM) is accessible over high bandwidth paths of one or more dynamic networks. The amount of memory can be chosen to roughly balance the areas devoted to processing and memory, and to match the memory access time and the processor clock.

Functions such as virtual address translation, caching, global shared memory and memory protection can be implemented by any combination of hardware and software (e.g., processor instructions). A tile 14 can include a translation lookaside buffer (TLB) to translate virtual addresses as they come out of the processor 30 on each tile 14. Separate TLBs for instruction and data can also be used. A mode bit for each can turn off translation. Events such as cache miss or translation fault can trigger a trap or interrupt to the processor 30, so that the processor 30 can handle the event in software (using instructions executed by the processor).

The software running on the processor 30 can also use various mechanisms to speedup TLB miss handling. For example, a software TLB miss handler can also maintain a software cache of TLB entries. This software cache used by the software TLB miss handler is also called a TSB.

For example, there can be multiple trap lines (conductors carrying trap signals) to the processor 30. Alternatively, there are few trap lines, but there is a trap vector that the processor 30 can access which encodes the type of trap that occurred. There is a mode indicator, which can allow selecting whether the software or the hardware handles these events. A hardware cache tag file can export a hit/miss status to the software rather than stalling the processor pipeline.

An array of tiles 14 can include one or more interface modules coupled to a switch on the periphery of the array to transfer data to and from an external device such as an I/O device. The interface module includes circuitry to mediate between the communication protocols of the dynamic networks and a communication protocol of the external device. An interface module is able to connect to ports of any of the dynamic network switch points on a tile, but any given interface module may only be connected to a subset of the dynamic networks through a subset of the switch points.

The configuration of the circuitry in a tile 14 can be controlled by local control information stored in the tile. For example, a module in the tile can be turned on or off (to save power for example) or configured into a variety of modes (e.g., to set protection levels) based on the state of a "mode indicator" (e.g., one or more bits) stored in a register or other memory store.

Various parts of the multicore chip, for example, a tile, a processor in a tile, a processor and caches in a tile, can also be selectively shut off to save power. When doing so, the system takes care to selectively shut off or activate certain parts of the tile that are needed for other parts of the system to operate. For example, if a tile's cache is the home cache for a given set of cache lines, then that tile's cache controller and cache might be powered up. Alternatively, they might take a set of actions before they are powered down. These actions can transfer responsibility of processing to other parts of the chip.

As line rates of traffic increasingly rise, it is often not possible to timely execute all of the required applications completely in software. For such cases, a processor 30 can include accelerator circuitry to speedup processing for special functions such as security, compression, network packet processing, etc. The accelerator circuits (accelerators) can be connected directly to a tile or a core, or they can be connected to the periphery of an interconnection network (for example, like an I/O device). The accelerators can also be full participants in coherence protocols and can contain caches. They can also use cache coherence transfers to transfer data between them and the other cores, or they can use DMA (direct memory access) to transfer data from the caches on the rest of the chip to the accelerator memory or caches.

In this situation, it is useful to support a unified interface to the accelerators, such as in a MiCA interface (multicore interface for coprocessor acceleration). MiCA like interfaces can support direct transfer of data from the chip's caches to the accelerators. The accelerators can also be virtualized so that more cores can access the accelerators than there are accelerators.

Accelerators often have a queue of requests from processors (or cores or tiles 14). They can perform the operations requested in the requests in the order in which the requests were received (for example).

A software system for the tiled compute node 10 includes a compiler that is able to schedule instructions for the processors in each of the cores. The compiler can also prepare communication over the static network, or messages to be sent over the dynamic network.

An exemplary operating system (OS) for the tiled compute node 10 can include a Linux-like kernel or a similar kernel running on a single tile 14. The OS can be a symmetric multiprocessing OS such as SMP Linux which can run on one or more tiles 14. Threads of SMP Linux running on multiple tiles 14 communicate with each other through coherence shared memory. Alternatively, the OS can be a distributed OS running on multiple tiles 14 sending messages to each of the processes on each of the tiles 14.

Another software system component that can be included is a hypervisor layer that provides physical device drivers for each physical device. The hypervisor also sets protection levels in the hardware. The hypervisor is responsible to multiplex various operating systems on the physical hardware and physical devices.

Application writers can program each of the cores or tiles 14 in the multicore chip using languages such as C. Similarly, they can program multiple tiles 14 by writing parallel programs using libraries such as pthreads, Message Passing Interface (MPI), or parallel languages such as OpenMP.

The software system can also include libraries that provide additional function such as interfaces that allow the user to access various hardware features directly, such as the registers related to the network, special purpose registers, synchronization operations, user-level message passing, etc.

Dynamic Code Generation for Trap Handling

Some techniques relate generally to providing support for exceptional events during program execution by generating code on the fly rather than by running conventional exception handling code.

Some instructions executed during normal program executing are "trapping"; that is, they cause an interrupt to be generated by the processor and the trap needs to be resolved before program execution can continue. In some cases the trap can be resolved and the instruction executed a second time to work correctly, as is true for page faults, some types of access violations, and other types of TLB (translation lookaside buffer) traps. In such cases there is typically no way for user space (a portion of memory segregated by the operating system for running user programs, e.g., as opposed to kernel space segregated for running the kernel) to avoid the cost of the trap. In other cases, such as an illegal instruction trap or a divide-by-zero trap, the program is performing an illegal operation and it may be challenging to "optimize" trap handling. Some implementations of a trap handler provide dynamic code generation for management of traps that can be avoided by having a different (typically slower) sequence of instructions be executed by the processor.

Typically a compiler will generate code that assumes the best case, i.e., that no trap will occur. If this assumption is incorrect, the operating system is expected to perform whatever "fix-up" is required to preserve the semantics of the code as generated by the compiler. For example, an unaligned access trap can occur on some machines when the compiler generates an instruction to load a four-byte value from memory, but the address specified is not evenly divisible by four. In this case the operating system may choose to respond to the resulting "unaligned access" trap by loading the appropriate value from memory, updating the application's register state as if the value had been loaded, and then continuing the application from the next instruction.

Such approaches to handling exceptional events are relatively slow, and in particular may not benefit from previous exposure to the same events. For example, each time an unaligned read occurs the same slow process may be performed again.

Dynamic code generation techniques, which include one or more of the following approaches, can be used in handling such exceptional events. For example, one approach would involve translating trapping machine instructions to sequences that do not cause traps. Another approach involves managing an efficient data structure that maps machine instructions to translations. In addition, other approaches involve safely coordinating shared data and machine-generated code without locks, efficiently and securely using user-space memory to store state in kernel code and updating the program image directly for frequently-trapping operations. Other approaches involve supporting pre-generated translations in the compiled code for efficiency; and generating compiler feedback to select trapping or non-trapping implementations.

The following approach may be used to execute an alternate sequence of instructions very efficiently when the original sequence is not performing well (for example, trapping or taking interrupts) for any reason. This example is described in the context of an interrupt handler for unaligned memory, but the approach is general and applies to other situations as well. When a trap due to an unforeseen event takes place, the interrupt handler for unaligned memory performs following actions to handle the trap. On entry, the handler stores some register state securely and efficiently, using user-space memory. The program counter (PC) and faulting instruction are looked up in a hash table to discover a translated sequence of instructions that can be run to perform the required load or store but without generating a trap. The interrupt handler restores the register state, and modifies the PC for the application to return to the translated code directly. The translated code executes (at the same protection level as the original code), performing the required load or store without generating a trap, then jumps back to the appropriate next instruction that the program would have run.

Networking Functionality Implementation in Server Node

Rather than a server node 50 serving as a termination point for network traffic, the techniques described below allow the server node 50 to be part of the network infrastructure. In other words, as server compute nodes are added, the server compute nodes implement networking functions within the nodes so that external networking components are not needed, as more nodes are added. This makes it easy to scale systems and add more nodes. This arrangement permits flexibility for adding network capability to each processing node (e.g., a multicore chip, as discussed above) so that as additional processing nodes are added to the system, the networking capabilities of the processing nodes allow the processing nodes to connect to each other, and to offer a single interface to the rest of the network.

Figure 3:
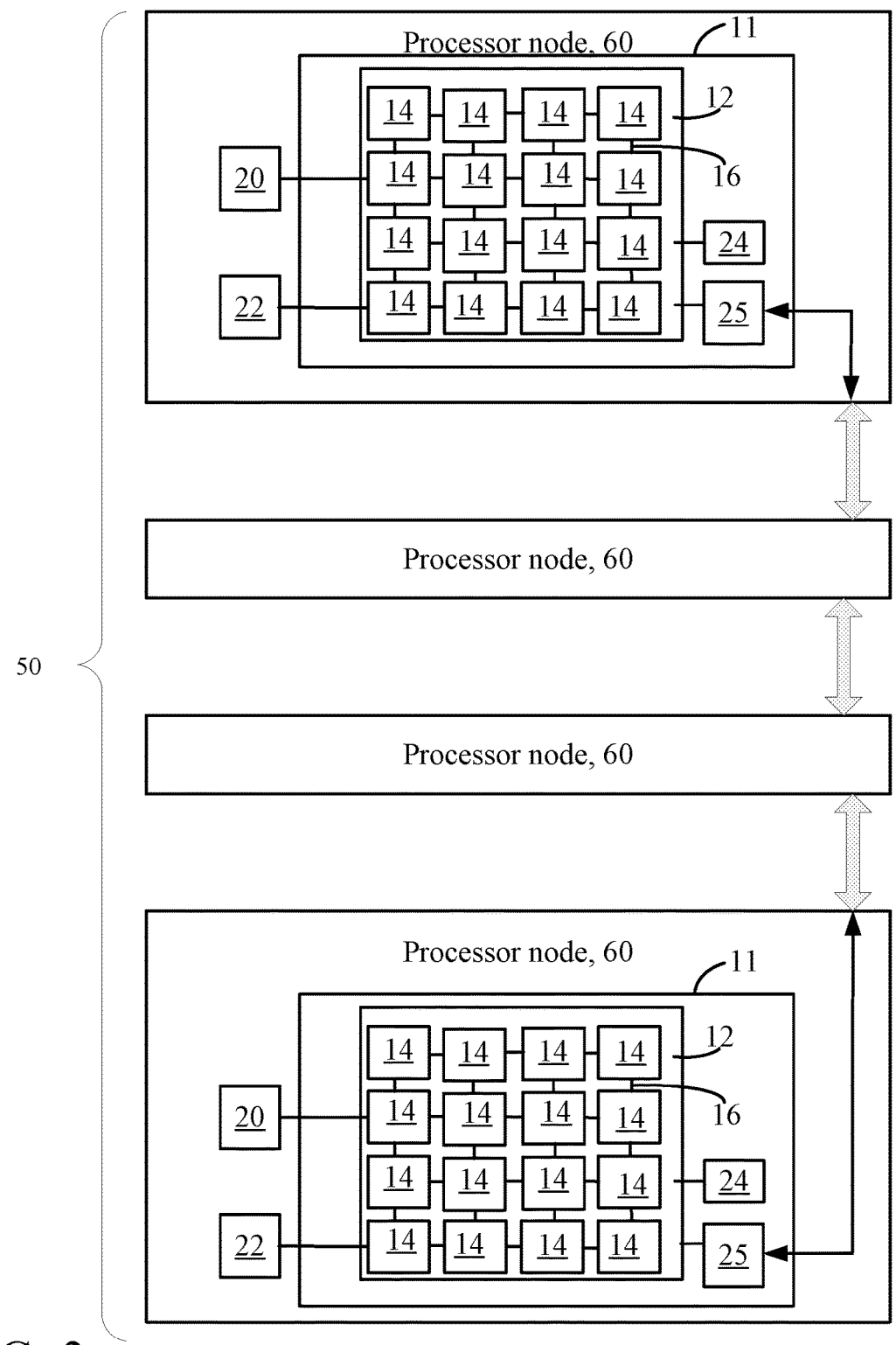
FIG. 3 is a block diagram depicting a stacking topology.

Referring to FIG. 3, aspects of a server 50 comprising plural compute nodes is shown. In one implementation the compute nodes are tiled compute nodes 10 according to configurations of FIGS. 1 and 2. In one example, the server 50 includes plural ones of the tiled computer nodes 10 in a stack topology where the processors use the on-board or on-chip L2 (layer 2) switch 25 allowing scalable node-stacking. The L2 switch 25 is disposed in each of the tiled compute nodes 10. Node stacking reduces the number of network ports required in the system thus reducing infrastructure costs, cooling, and area. The server 50 executes an operating system and application software and is integrated into a network of other servers.

In alternative topologies, the processor node can provide additional functions that enable flexibility in the network by using software 26 (FIG. 2) running on the processor cores (or in firmware). For example, the processor node 10 can provide load balancing across multiple nodes and hence a set of processors can be seen as a single network endpoint. Load balancing software distributes work across servers sending new tasks to the "least busy" server rather than always being sent to a fixed node. Traditionally, load balancer is implemented as a dedicated hardware unit. This arrangement allows load balancing function to be built into the server, enabling server capabilities to be scaled up without the cost of a new load balancer and new or additional switching hardware.

The software 26 can alternatively or in addition thereto implement routing as fast-path software running within the tiled compute node 10 thus supporting various protocols from simple layer-2 routing to IP routing, load-based routing, and "address" based routing. As used herein fast path software is used to describe processing where the most commonly occurring network processing tasks are more efficiently executed with uncommon tasks being off-loaded. Address-based routing could be used to build large message/socket-based systems implementing RDMA switching. For example, nodes can communicate directly based on physical addresses rather than requiring a complete network stack. This reduces latency and increases throughput.

In addition to flexible routing algorithms, in-network processor nodes allow distribution of services such as DPI (deep packet inspection). Thus networks can be monitored and protected without the need for dedicated devices at network choke points. The routing algorithms would be executed on at least one of the tiles 14 and in some instances plural ones of the tiles 14.

Fast path hardware is provided in the processor node to allows low-latency and high-bandwidth switching capability. A high speed programmable packet classifier performs layer-2 parsing as well as basic routing decisions. DMA (direct memory access) hardware moves packet data through the system from ingress port to egress port.

General purpose cores may be used to implement more sophisticated routing algorithms as a control path while data path is still managed by efficient purpose-built hardware.

Hardware services including classification, load-balancing, buffer management, and egress-reordering can be leveraged to implement the raw switching component of the system. The system includes dedicated hardware (in addition to general purpose software) that provides efficient offload of the above tasks without using the general purpose compute cores or tiles 14. Local traffic for the individual server node, which may include multiple tiles 14 or cores can be identified based on a physical port number (or MAC address) as well as more sophisticated dynamic information such as system load.

Packets can also be switched based on a range comparison with an address field in the packet. In such a system, a large flat address space can be distributed across many nodes. Packets are switched to the correct endpoint based on the address inside the packet. This type of switching allows arbitrary topologies to be built and implements messaging and data protocols such as RDMA for switching to another device outside of the server.

Figure 4:
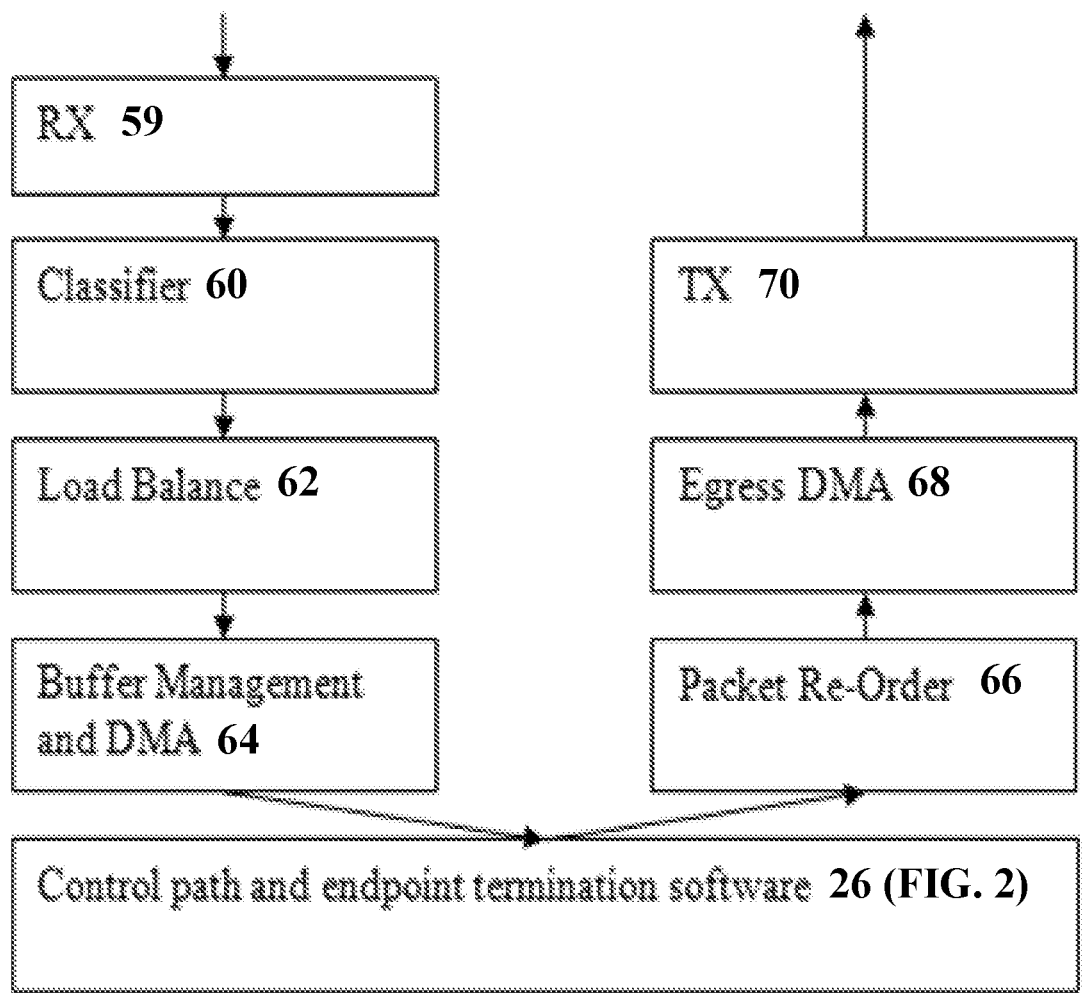
FIG. 4 is a flow chart depicting network traffic transmit and receive topology for a tiled compute node.

Referring now to FIG. 4, packet processing is shown. Packets arrive at a receive interface 59 (RX) and are passed to a classifier engine 60 running on the tiled compute node 10 as part of a network interface engine. One such example of a network interface engine is a multicore Programmable Intelligent Packet Engine (mPipe™ Tilera Corporation assignee of the present application). In FIG. 4 the control path and termination software all execute on the tiles, whereas the remaining functional blocks shown, are part of the mPIPE™ hardware for handling RX/TX packets. This hardware includes the classifier engine 60.

The classifier engine 60 parses the packet and determines the flow to which the packet belongs. The classifier engine 60 may determine the egress port or this determination can be left to software running on the cores 14. The classifier engine 60 receives the incoming packets. If the classifier engine can determine the correct egress port for the packet, then the classifier engine 60 decides and the incoming packet is directed to the determined egress port of the L2 switch 25. On the other hand if the classifier engine 60 cannot make that determination, the tile software executing on one or more of the tiles makes the determination. In general, the classifier engine 60 will not determine egress ports when the policy governing the packets is relatively complex. In that instance, the tile software executing on one or more the tiles 14 determines the egress port. Incoming packets can, for example, be directed to a specific egress port. When incoming packets are directed to a specific egress port this is a switched flow meaning that the packet is intended for a different destination other than the specific server node 50, whereas when the packet is directed to a local core 14, this means that the packet flow terminates at the local server node 50.

The load balancer 62 executing in software 26 determines what core 14 will operate on the packet and enqueues a packet descriptor generated by the classifier 60. Buffer management hardware 64 assigns on/off chip memory space to hold the packet data. The packet is handed to the software 26 running on the processor cores (control point and endpoint termination software 26).

The software 26 running on the processor cores can implement any routing/switching policy chosen, thus allowing the production of a soft router or switch. Here again, packets can be directed to an egress port (switched) or to local termination software (not shown).

For egressed packets, the descriptor is enqueued for egress and is reordered 66 based on original arrival order. An egress DMA engine 68 gathers the packet data and transmits it to a (TX) physical interface 70 for transmission from the node 10.

The classifier engine 60 is a programmable core that handles stateless packet parsing and classification. This processor 60 receives headers of incoming (RX) packets and assists with load balancing and parsing operations prior to the packets being either switched out an egress port or delivered to one of the tile processors. The classifier engine 60 identifies incoming packet flows and determines how a local node is to handle the packet. The classifier engine 60 performs the functions of layer (L2/3/4) parsing, data payload offset, header error checking, flow hashing, MAC/IP address and port matching, virtual local area networking (VLAN) and policy lookups.

A number of embodiments of the invention have been described. Nevertheless, it will be understood that various modifications may be made without departing from the spirit and scope of the invention. Accordingly, other embodiments are within the scope of the following claims.

What is claimed is:

1. A server node, comprising:
   a plurality of tiled compute nodes in a node stack topology, with multiple ones of the plurality of tiled compute nodes each comprising:
      an array of interconnected tiles with each of the tiles including a processor and a switch with switches of the tiles configured to couple the array of interconnected tiles to network among the processors; and
   switching circuitry configured to couple the plurality of tiled compute nodes to an external network, with the switching circuitry configured to provide network functions within the server node.

2. The server node of claim 1 wherein the networking switching functions within the server node are further configured to:
   connect the plurality of tiled compute nodes to offer a single interface to the external network coupled to the server node.

3. The server node of claim 1 wherein each of the plurality of tiled compute nodes includes a layer 2 switch that uses media access control addresses for forwarding frames and with the plurality of tiled compute nodes arranged in the stacked node topology.

4. The server node of claim 3 wherein the layer 2 switch corresponds to the Open Systems Interconnection model and which uses media access control addresses for forwarding frames.

5. The server node of claim 1 wherein the server node is configured to execute an operating system and execute application programs under control of the operating system.

6. The server node of claim 1 wherein the server node is configured to add additional tiled compute nodes to the server node, and with the switching circuitry configured to couple the plurality of tiled compute nodes including the added additional tiled compute nodes to the external network.

7. The server node of claim 1 wherein each of the plurality of tiled compute nodes includes a layer 2 switch to couple the corresponding compute node to the external network, and the server node is configured with networking functions in the tiled compute nodes that are arranged in the stacked node topology to provide scalable node-stacking.

8. The server node of claim 6 wherein the scalable node stacking reduces the number of network ports required in the server node.

9. The server node of claim 1 wherein network functions are implemented with software or firmware that configure processors in the tiled compute nodes.

10. The server node of claim 1 wherein the server node is configured with fast path software that processes network processing tasks according to whether the processing task is a common task or an uncommon task.

11. The server node of claim 1 wherein the server node is configured with address-based routing.

12. A server node, comprising:
a plurality of tiled compute nodes in a node stack topology, with multiple ones of the plurality of tiled compute nodes each comprising:
an array of interconnected tiles with each of the tiles including a processor and a switch with switches of the tiles configured to couple the array of interconnected tiles to an internal network among the processors; and
switching circuitry including a layer 2 switch in each of the tiled compute nodes that is configured to couple the plurality of tiled compute nodes to an external network, with the switching circuitry configured to provide network functions within the server node by connecting the plurality of tiled compute nodes to the external network to offer a single interface to the external network coupled to the server node.

13. The server node of claim 12 wherein the layer 2 switch corresponds to the Open Systems Interconnection model and uses media access control addresses for forwarding frames.

14. The server node of claim 12 wherein the server node is configured to execute an operating system and execute application programs under control of the operating system.

15. The server node of claim 12 wherein the server node is configured to add additional tiled compute nodes to the server node, and with the switching circuitry configured to couple the plurality of tiled compute nodes including the added additional tiled compute nodes to the external network.

16. The server node of claim 12 wherein the stacked node topology reduces the number of network ports required in the server node and network functions are implemented with software or firmware that configure processors in the tiled compute nodes.

17. The server node of claim 1 wherein the server node is configured with fast path software that processes network processing tasks according to whether the processing task is a common task or an uncommon task.

18. The server node of claim 1 wherein the server node is configured with address-based routing.

* * * * *